SOLUBILITY OF POLY 2,6-NAPHTHALOYL OXAMIDRAZONE

SOLUBILITY OF POLYFUMAROYL-OXAMIDRAZONE

SOLUBILITY CURVE OF POLYISOPHTHALOYL-OXAMIDRAZONE

SOLUBILITY OF POLYRIDINE-2,6 CARBOXY-OXAMIDRAZONE

United States Patent Office 3,583,953
Patented June 8, 1971

3,583,953
POLYACYLOXAMIDRAZONE SOLUTIONS AND THE PRODUCTION OF POLY-BIS-(1,2,4-TRI-AZOLE) PRODUCTS
Hans-Dieter Rupp, Erlenbach, Erhard Siggel, Seckmauern, Gerhard Meyer, Obernburg, and Ernst-Georg Worbs and Michael Wallrabenstein, Erlenbach, and Albert Schopf, Hering, Odenwald, Germany, assignors to Glanzstoff AG, Wuppertal, Germany
Filed Apr. 5, 1968, Ser. No. 719,027
Claims priority, application Germany, Apr. 8, 1967, G 49,779, G 49,780
Int. Cl. C08f 3/60; D01f 7/00
U.S. Cl. 260—78.4
11 Claims

ABSTRACT OF THE DISCLOSURE

An aqueous alkali metal hydroxide solution in which there is dissolved a polyacyloxamidrazone, the resulting alkaline polymer solution being useful for the production of heat-resistant shaped products such as filaments, films, coatings and the like. A process for producing these products includes the steps of forming the polymer solution into a filament or film in contact with an acid precipitation bath, washing the precipitate and subsequently heating to a temperature of approximately 230–350° C.

Figure 1:
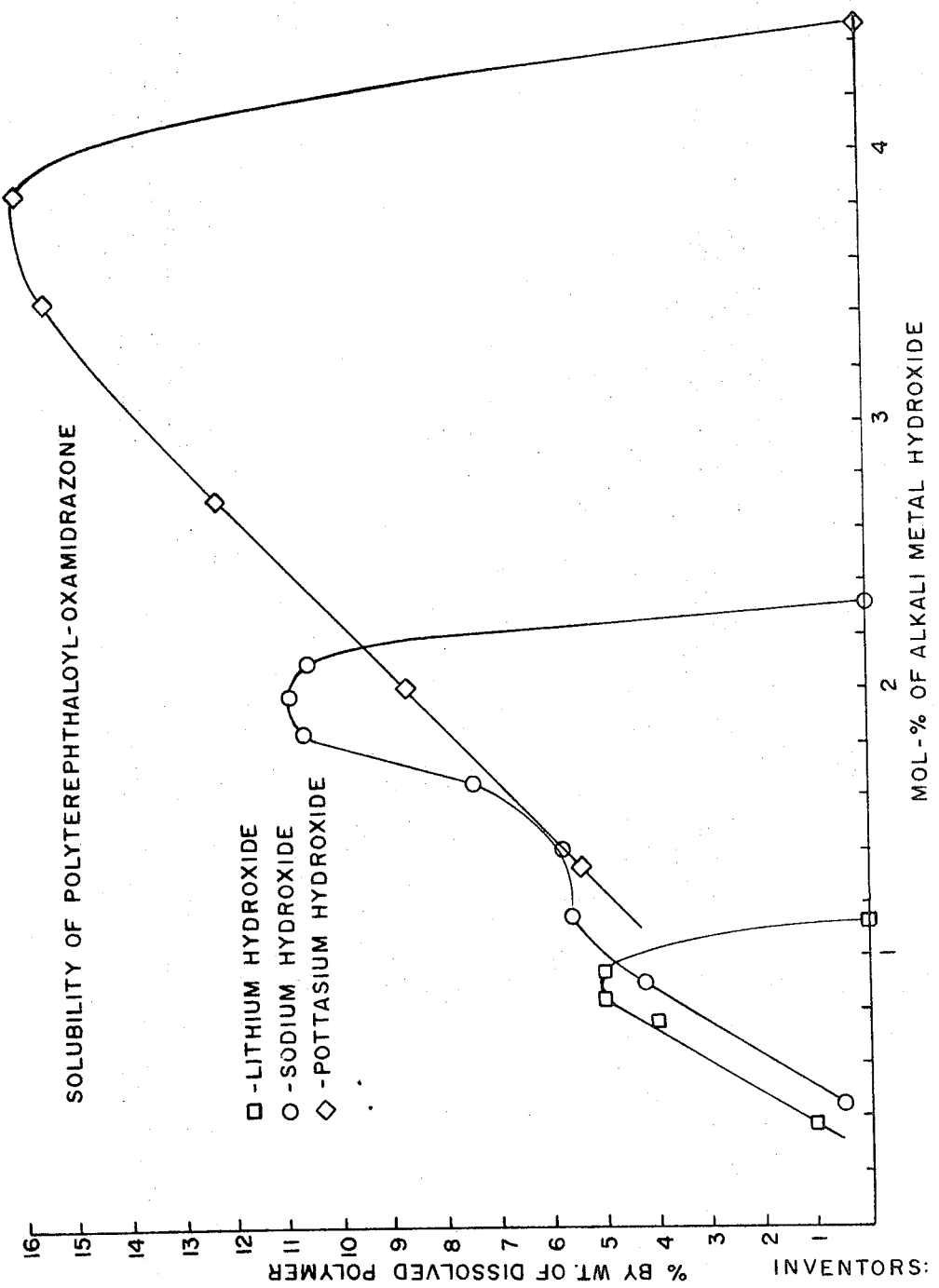

It is known that polytriazoles can be obtained by the reaction of dinitriles with dihydrazides or by heating cyanocarboxylic hydrazides. The resulting products are resistant to high temperatures, particularly if they contain aromatic groups in the polymer chain.

The present invention generally relates to the production of filaments, films and the like from aqueous alkaline solutions of polyacyloxamidrazones which are polymers characterized by recurring units of the formula

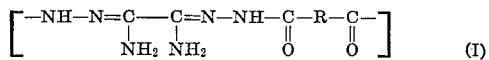

wherein R is a divalent organic radical of 2 up to about 12 carbon atoms in an essentially hydrocarbon structure. These polyacyloxamidrazones can be produced by the reaction of oxalic acid bis-amidrazone with dicarboxylic acid dichlorides or dibromides, as discussed more fully hereinbelow. The molecular weight of the polyacyloxamidrazone tends to vary, depending upon the manner in which the reaction is carried out. If the polymer has a relatively low molecular weight, it is somewhat soluble in specific organic solvents such as N-methylpyrrolidone, dimethylformamide, hexamethylphosphoric acid amide or dimethylsulfoxide. By comparison, the higher molecular weight polymers of this type are insoluble in all organic solvents. To some extent, the higher molecular weight polymers can be dissolved in a few acids, for example, concentrated sulfuric acid, formic acid or trifluoroacetic acid. However, such acid polymer solutions are disadvantageous because the acid causes a noticeable decomposition of the polymer. Although the higher molecular weight polymers of acyloxamidrazones have a number of interesting properties, particularly in the formation of filaments, films, coatings or the like, no method has been known for processing them for a solution, and since they do not melt, there appeared to be no way in which they could be formed or shaped into useful articles.

The present invention is therefore directed in part to a novel composition consisting essentially of a dilute aqueous alkali metal hydroxide solution in which there is dissolved a polyacyloxamidrazone having the recurring units of the formula

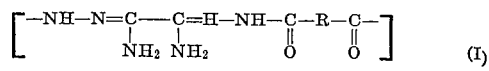

While these novel compositions are useful in themselves for coating or impregnating surface structures or substrates of various types, e.g. metals, glass, paper, textiles and the like, they are particularly useful in accordance with the present invention as spinnig or casting solutions for the production of filaments, films and the like.

Thus, the present invention further relates to the production of filaments or films consisting of or predominately made up of a specific polytriazole, which may be dientified as a poly-bis-(1,2,4-triazole) in which the recurring units have the formula

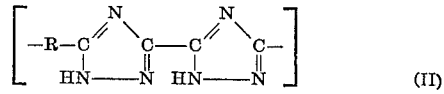

wherein R has the same meaning as set forth above and wherein two triazole rings are connected directly adjacent to one another.

These so-called poly-bis-(1,2,4-triazoles) are formed by the cyclodehydration of the polyacyloxamidrazone (I) as initially formed in the reaction of oxalic acid bis- amidrazone with a dicarboxylic acid dihalide. The polytriazole products obtained in this manner are distinguished by very good heat resistance, their decomposition temperature generally lying above 350° C. However, since these polytriazoles are insoluble and non-meltable, they cannot be directly formed or shaped into useful products.

A similar problem has arisen in the prior art where it is known that polymers having similar properties, e.g. polyimides which are also insoluble and non-meltable, can be formed into useful shaped articles by first processing an intermediate product which contains amide and carboxylic acid groups capable of being transformed into imide groups and then dehydrating the intermediate shaped product. An analogous process could not be carried out for the production of haped bodies, especially filaments and films, in order to produce the presently described poly-bis-(1,2,4-triazoles), since the high molecular weight polyacyloxamidrazone intermediate products arising in the production of such polymers are also non-meltable and generally insoluble in all of the usual solvents.

It was therefore a primary object of the present invention to provide a satisfactory solution of a high molecular weight polyacyloxamidrazone which would be capable of being formed or shaped into useful products. It was also an object of the present invention to provide a process whereby the intermediate polyacyloxamidrazone could be used for the production of useful filaments, films or the like, especially by transforming the intermediate into a polybis-(1,2,4-triazole) with the final product exhibiting good thermal properties, i.e. a high resistance to heat. These and other objects and advantages of the invention will become more apparent upon consideration of the following detailed disclosure.

It has now been found, in accordance with the present invention, that one can achieve a highly useful polymer solution by dissolving the polyacyloxamidrazone of the Formula I in a dilute aqueous alkali metal hydroxide solution. It is particularly desirable to employ an aqueous solution having an alkali metal hydroxide concentration of about 1 to 11 mol percent( with reference to the water) and to dissolve therein about 4 to 30% by weight, preferably 6 to 16% by weight, of the polyacyloxamidrazone. Moreover, it has been found that these novel polymer solutions can be readily spun, cast, extruded or similarly processed into a heat-resistant filamentary or filmaceous polymer consisting essentially of a poly-bis-(1,2,4-triazole) by forming the alkaline polymer solution into a film or filament in contact with an acid precipitating bath, washing the resulting polyacyloxamidrazone film or filament to remove adherent bath substances, and subsequently heating the film or filament in an inert atmosphere at a temperature of approximately 230-350° C.

The polyacyloxamidrazone as a polymer with the recurring head-to-tail units of the Formula I are readily prepared from known substances, namely oxalic acid bisamidrazone and a dicarboxylic acid dihalide, preferably the dichloride, by a polycondensation of the two monomeric components at relatively low or moderate temperatures, e.g. 0-60° C., in a liquid solvent medium containing an acid acceptor which is essentially a basic-reacting compound capable of combining with the acid halide molecules, i.e. HCl or HBr, which are split off during the polycondensation. In order to achieve a uniform reaction, the reaction medium is strongly mixed or agitated and also cooled to remove the heat generated by the exothermic reaction.

In general, the reaction of the oxalic acid bisamidrazone and the dicarboxylic acid dihalide proceeds in a satisfactory manner in any liquid solvent or mixture of solvents, i.e. in a single phase system composed of one solvent or a mixture of miscible solvents or in a two phase system in which the solvents for each monomeric component are immiscible with each other. However, in order to achieve a relatively high molecular weight polycondensate which is particularly desirable as a fiber- or film-forming polymer, it is especially desirable to carry out the polycondensation in a two phase solvent system as fully described in the copending application of Helmut Mägerlein et al., Ser. No. 716,364, filed Mar. 27, 1968, the disclosure of this application being incorporated herein by reference as fully as if it had been set forth in its entirety. In this manner, it is possible to obtain a polycondensate having a molecular weight so high that the polymer is essentially insoluble in organic solvents, including N-methylpyrrolidone, hexamethylphosphoric acid amide, dimethyl formamide or dimethyl sulfoxide.

Thus, for purposes of the present invention, good results are ensured by using only those polyacyloxamidrazones which are insoluble in organic solvents and which have a molecular weight corresponding to a reduced visvosity ($\eta_{red}$) of at least about 2 and preferably 3 up to about 7, especially about 4.5 to 6.5, measured as 1 gram of the polymer dissolved in 100 ml. of a 10% by weight aqueous KOH solution at 20° C.

The dicarboxylic acid dichloride or dibromide used in the preparation of the polyacyloxamidrazone has the formula XOC—R—COX wherein R is essentially a divalent hydrocarbon radical of about 2 to 12 carbon atoms, preferably 2 to 6 carbon atoms, and X is preferably a chlorine atom. The term "hydrocarbon radical" is employed herein with reference to aliphatic, cycloaliphatic, aryl and aralkyl members consisting essentially of carbon and hydrogen atoms without excluding the presence of a hetero atom such as oxygen, sulfur or nitrogen which does not materially affect the essential hydrocarbon nature of the divalent radical. Various dicarboxylic acid halides are illustrated in the above mentioned copending application of Helmut Mägerlein et al. By way of example, R can be any one of the following radicals: —CH=CH,

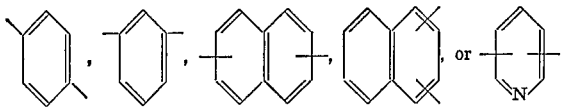

For the preparation of filaments or films which are to be stretched for molecular orientation, it is especially desirable to select those compounds in which R is an essentially aromatic hydrocarbon radical or an unsaturated aliphatic hydrocarbon radical such that the carbon-to-carbon double bonds of the radical R are conjugated with the carbon-to-oxygen double bonds of the adjacent carboxy groups

Thus, R preferaly represents —CH=CH— o r an aromatic radical such as 1,4-phenyl, 1,3-phenyl, 2,6-naphthyl, 1,4-naphthyl or the like.

As the solvent for preparing the polyacyloxamidrazone solution, one can use a dilute aqueous solution of any alkali metal hydroxide although sodium hydroxide and potassium hydroxide are generally preferred simply as an economical consideration. Mixtures of alkali metal hydroxides may also be used. It is quite surprising that the above-noted high molecular weight polyacyloxamidrazones, which are practically insoluble in other solvents, can be brought into solution by using the aqueous alkali metal hydroxide solvents of the invention. Thus, it is possible to dissolve substantial amounts of the polymer, e.g. up to an amount of 15 to 20% by weight or more which is entirely satisfactory for the production of filaments, films or the like. In general, it is preferable to work with solutions which contain the polyacyloxamidrazone in an amount of at least 4% by weight and preferably in a range of about 6 to 16% by weight, but extending up to as high as 30% by weight.

The solvent capacity of the aqueous alkali metal hydroxide solution for the polymer depends upon a number of factors, including the concentration of the alkali metal hydroxide, the particular polyacyloxamidrazone being dissolved and, to a lesser extent, the average molecular weight of the polyacyloxamidrazone. The presence of slight amounts of other substances, e.g. alkali carbonates or the like, does not influence the solvent capacity of the alkali metal hydroxide solution. The solubility characteristics of particular polyacyloxamidrazones in the aqueous alkaline solvent of the invention can be readily determined by a few preliminary tests so as to achieve the polymer concentration desired for further processing.

Figure 2:
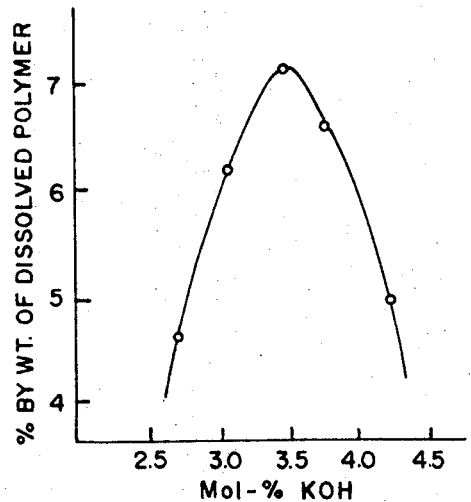
Figure 3:
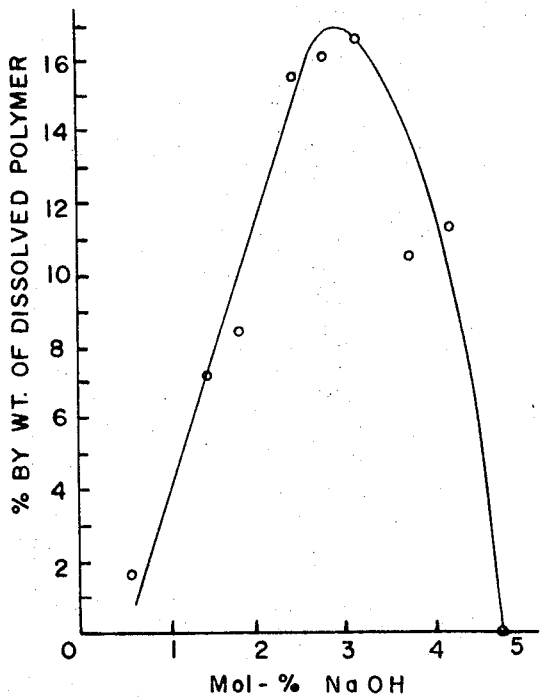
Figure 4:
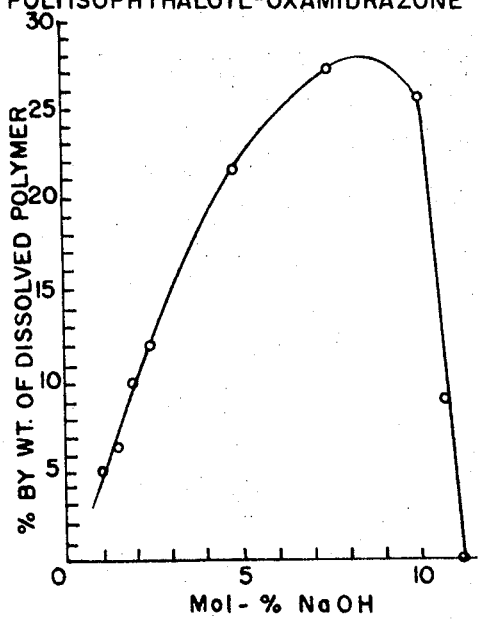

For purposes of illustration, the solubility curves of a few preferred polyacyloxamidrazones are set forth in the accompanying drawings with reference to the concentration of lithium, sodium or potassium hydroxide solutions. In the drawings:

FIG. 1 sets forth the solubility curves of polyterephthaloyl-oxamidrazone in LiOH, NaOH and KOH;

FIG. 2 sets forth the solubility curve of poly-2,6-naphthaloyl-oxamidrazone in KOH;

FIG. 3 sets forth the solubility curve of polyfumaroyl-oxamidrazone in NaOH;

FIG. 4 sets forth the solubility of polyisophthaloyl-oxamidrazone in NaOH; and

Figure 5:
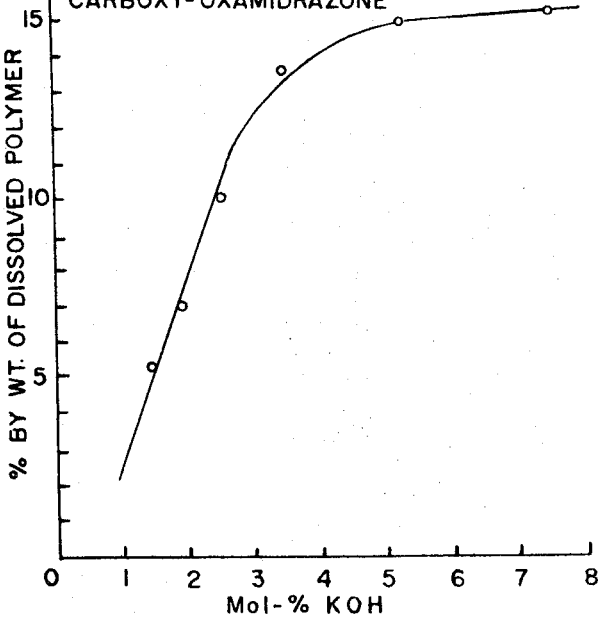

FIG. 5 sets forth the solubility curve of polypyridine-2,6-carboxy-oxamidrazone in KOH.

The following table sets forth the maximum attainable solubility of the various polyacyloxamidrazones in dilute aqueous alkali metal hydroxide solutions, all solubility values in the table and the curves of the drawings having been determined at normal temperature (20° C.):

TABLE

| Polymer | Maximum polymer conc. in solution (percent by weight) | Conc. of aqueous alkaline solution in mol percent | | |
|---|---|---|---|---|
| | | LiOH | NaOH | KOH |
| 1..... Polyterephthaloyl-oxamidrazone. | 5 | 0.85 | | |
| 2..........do............. | 11 | | 2.0 | |
| 3..........do............. | 16 | | | 3.8 |
| 4..... Polypyridine-2,6-dicarboxy-oxamidrazone. | 15.3 | | | 7.5-8.0 |
| 5..... Poly-2,6-naphthaloyl-oxamidrazone. | 7.1 | | | 3.5 |
| 6..... Polyfumaroyl-oxamidrazone. | 17 | | 3.5 | |
| 7..... Polyisophthaloyl-oxamidrazone. | 28 | | 8.0 | |

Of the various polyacyloxamidrazones with recurring units of the Formula I, the polyterephthaloyl-oxamidrazone exhibits especially good properties in various applications as a coating, film or filament. Thus, in producing solutions of this particular polymer, one preferably uses an aqueous alkaline solution with a KOH concentration of about 3 to 4 mol percent or a NaOH concentration of about 1 to 2 mol percent. Within these ranges of concentration, about 5 to 16% by weight of polyterephthaloyloxamidrazone can be brought into solution.

In order to obtain coatings or impregnations of various substrates, it is merely necessary to prepare the dilute alkaline solution of the polymer and apply it to the substrate, either concurrently or subsequently contacting the resulting deposited solution with an aqueous acid solution sufficient to neutralize the alkali and precipitate or coagulate the polyacyloxamidrazone. By using the polyacyloxamidrazone solution as a liquid spinning or casting medium and introducing the freshly spun or extruded solution into an acid bath, the polyacyloxamidrazone can be precipitated or coagulated in the form of filaments or unsupported films as discussed more fully below. In either case, one obtains a filmaceous or filamentary polyacyloxamidrazone which in itself possesses useful properties, particularly in view of its content of reactive amino and imino groups as well as its insolubility in most solvents.

The polyacyloxamidrazone solutions of the invention are especially useful in the production of filaments and films which can be converted into a poly-bis-(1,2,4-triazole) by a cyclodehydration of the initially formed or shaped polyacyloxamidrazone. For example, filaments or films with especially good properties are obtained by the use of polyterephthaloyl- or polyisophthaloyl-oxamidrazone in the formation of filaments or films converted into a polytriazole in accordance with the invention.

In making filaments or films, it is likewise preferable to employ dilute sodium or potassium hydroxide solutions even through other alkali metal hydroxides are also suitable as the solvent for the polyacycloamxidrazone. In general, the concentration of the alkali metal hydroxide with reference to the water of the aqueous solvent can vary over a range of approximately 1 to 10 mol-percent, preferably about 2 to 8 mol-percent, while the concentration of the polyacyloxamidrazone in the solvent should be at least 4% by weight, e.g. in a range of 4 to 20% by weight and preferably about 6 to 16% by weight. By way of example, it is especially advantageous in working with such polymers as the polyterephthaloyl- or polyisophthaloyl-oxamidrazone to use as the solvent a 4.5 to 10% by weight potassium hydroxide solution.

The polyacyloxamidrazone solution is spun or extruded with conventional spinning or casting apparatus into an acid precipitating bath in order to initially form the solid film or filament. The precipitating bath is preferably a dilute aqueous acid solution, e.g. by using a dilute aqueous solution of an organic or especially inorganic acid, solutions of salts of strong acids with weak bases, or solutions of acid salts. The acid concentration is merely sufficient to neutralize the spinning or casting solution so as to precipitate the polymer. Accordingly, there is no criticality in selecting any particular acid-reacting substance or mixture of such substances in providing a satisfactory acid bath. However, it has been found to be particularly advantageous to use a 5–25% by weight aqueous ammonium chloride solution as the acid precipitating bath. The temperature of the precipitating bath is preferably maintained at normal or room temperature, e.g. approximately 20° C.

After leaving the bath liquid, the resulting filament or film is washed, preferably with water, so as to thoroughly remove adherent foreign substances such as salts or the like which are normally present in the bath liquid and which tend to be withdrawn in small amounts on the filament or film. After washing, it is desirable to dry the filament or film to remove the wash liquid, e.g. by drying in air at moderate temperatures of not more than 110° C.

The filaments or films can be stretched either before, during or after the washing step. For example, stretching can occur in the precipitating bath itself and/or at any point prior to the final heat treatment for conversion of the polyacyloxamidrazone into a polytriazole. Conventional film- or filament-stretching devices can be used, and this stretching is preferably accomplished at moderate or room temperatures, e.g. 15–25° C. In general, it is sufficient to impart a stretch of about 1.2 to 3 times the original length of a filament, preferably about 1.5 to 2 times its original length.

According to the invention, the filaments or films after being washed are finally heated in an inert atmosphere at a temperature of about 230–350° C., preferably 240–320° C. for a period of time sufficient to convert the polymer predominately or substantially entirely into the insoluble and non-meltable form of a poly-bis-(1,2,4-triazole). Temperatures above 350° C. should be avoided to prevent decomposition, and temperatures below about 230° C. either fail to provide a sufficient reaction or else require excessively long periods of treatment. It is most convenient to carry out this heating or conversion step by heating the filaments or films in an oven, first at about 240° C. and then gradually raising the temperature to about 320° C.

In order to avoid side reactions during the conversion of the product into the form of the poly-bis-(1,2,4-triazole), it is desirable to work under a substantially oxygen-free atmosphere, i.e. any suitable inert atmosphere such as nitrogen. It will be understood, of course, that slight variations in the chemical structure of the final polytriazole product as may occur by incomplete conversion and/or a small number of side reactions will not strongly influence the properties of the final product. However, in order to achieve optimum properties, it is desirable to carry out the conversion as far as possible with reference to the achievement of a poly-bis-(1,2,4-triazole) according to Formula II.

The invention is further illustrated but not restricted by the following specific exemplification.

EXAMPLE 1

A polyterephthaloyl-oxamidrazone, which has a reduced viscosity ($\eta_{red}$) of 5.5, measured as a 1% by weight solution of the polymer in an aqueous 10% by weight KOH solution at 20° C., is dissolved in a 6% by weight aqueous KOH solution at about 20° C. Sufficient polymer is dissolved to provide an 8% by weight polymer solution which is then spun by means of a 120-hole nozzle (each hole or opening in the nozzle having a diameter of 90 millimicrons) into an aqueous acidic precipitation bath consisting of a 10% by weight ammonium chloride solution. This acid bath has a temperature of about 20° C. Immediately after leaving the acid bath, the precipitated filaments are conducted over a 2-stage galette and stretched 50%. The filaments are then conducted through a washing zone for thorough washing with water and then dried on a take-up roll. The dry filaments are then heated in an oven under a nitrogen atmosphere, beginning at 240° C. and gradually raising the temperature to 320° C. over a period of 48 hours. The resulting conversion of the polymer into the poly-bis-(1,2,4-triazole) can be determined by its infrared spectrum. The resulting filaments have a tensile strength of 1.5 grams/denier and an elongation of 5–6%. They are very resistant to heat.

Films can be produced in the same manner as the foregoing example except that the initial polymer solution is extruded or cast through a wide slot or an annular opening into the precipitating bath. Other polyacyloxamidrazones can be converted into poly-bis(1,2,4-triazole) films or filaments in exactly the same manner with only slight variations in the concentrations of the polymer solutions and acid bath.

EXAMPLE 2

6% by weight of polyterephthaloyl-oxamidrazone with a reduced viscosity ($\eta_{red}$) of 6.2, measured as mentioned in Example 1, is dissolved in a 6% by weight aqueous KOH solution at ambient temperature. The polymer solution is then deaerated by vacuum.

A film of 0.2 mm. is cast from a usual casting apparatus. The film is conducted through an aqueous precipitating bath consisting of a 20% by weight ammonium chloride. This bath has a temperature of about 22–24° C. After leaving the precipitating bath the precipitated film is immediately conducted through a washing zone. Subsequently the film is heated in an oven under an inert atmosphere as described in Example 1.

EXAMPLE 3

A poly-2,6-naphthyl-oxamidrazone with a reduced viscosity ($\eta_{red}$) of 3.36, measured as a 1% by weight solution of the polymer in an aqueous 10% by weight KOH solution at 20° C., is dissolved in a 15% by weight aqueous KOH solution at ambient temperature. Sufficient polymer is dissolved to provide a 7% by weight polymer solution which is then spun by means of a 120-hole nozzle (each hole in the nozzle having a diameter of 90 millimicrons) into an aqueous acidic precipitation bath consisting of a 30% by weight ammonium sulfate solution. This acid bath has a temperature of about 20° C. After leaving the acid bath the precipitated filaments are immediately conducted over a 2-stage galette and stretched 10%. The filaments are then conducted through a washing zone for thorough washing with water and then dried on a take-up roll. The dry filaments are then heated in an oven under a nitrogen atmosphere, beginning at 240° C. and gradually raising to 320° C. over a period of 36 hours. The resulting filaments have a tensile strength of 1.1 gram/denier and an elongation of 4–5%.

The invention is hereby claimed as follows:

1. A process for the production of a filamentary or filmaceous heat-resistant polymer consisting essentially of a poly-bis-(1,2,4-triazole) which comprises:

dissolving in a dilute aqueous alkali metal hydroxide solution a polyacyloxamidrazone having the recurring units

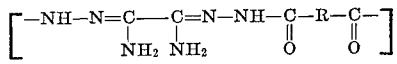

wherein R is a divalent hydrocarbon radical of from 2 to about 12 carbon atoms;

forming the solution into a film or filament in contact with an acid precipitating bath;

washing the resulting polyacyloxamidrazone film or filament to remove adherent bath substances; and heating the film or filament in an inert atmosphere at a temperature of approximately 230–350° C.

2. A process as claimed in claim 1 wherein the aqueous solution has an alkali metal hydroxide concentration of about 2 to 8 mol percent and there is dissolved therein about 6 to 16% by weight of said polyacyloxamidrazone.

3. A process as claimed in claim 2 wherein said alkali metal hydroxide is a substance selected from the group consisting of sodium hydroxide and potassium hydroxide.

4. A process as claimed in claim 1 wherein said precipitating bath is an aqueous solution of an acid selected from the group consisting of organic and inorganic acids, salts of a strong acid with a weak base, and acid salts.

5. A process as claimed in claim 1 wherein said precipitating bath is a 5–25% by weight aqueous ammonium chloride solution.

6. A process as claimed in claim 1 wherein R represents a member selected from the group consisting of an aromatic radical and the radical —CH=CH—.

7. A process as claimed in claim 1 wherein the polyacyloxamidrazone is polyterephthaloyl-oxamidrazone.

8. A process as claimed in claim 1 wherein the polyacyloxamidrazone is polyisophthaloyl-oxamidrazone.

9. A process as claimed in claim 1 wherein polyterephthaloyl-oxamidrazone is dissolved in a 4.5 to 10% by weight aqueous KOH solution, the solution is extruded into a 5 to 25% by weight aqueous ammonium chloride solution as a precipitating bath, the resulting precipitated polymer is washed with water and subsequently heated at about 240° C. to 320° C.

10. A process as claimed in claim 1 wherein said solution is spun into filaments in said precipitating bath and the filaments are stretched at a point prior to being heated at said temperature of 230–350° C.

11. The product obtained by the process of claim 1.

References Cited

UNITED STATES PATENTS

| | | | |
|---|---|---|---|
| 3,061,590 | 10/1962 | Remy | 260—72 |
| 3,318,728 | 5/1967 | Lilyquist | 260—78.4 |
| 3,375,230 | 3/1968 | Oja et al. | 260—72 |
| 3,476,719 | 11/1969 | Frazer et al. | 260—78TF |

OTHER REFERENCES

"Polycondensation of Oxalamidrazone With Dicarboxylic Acid Chlorides," by Saga et al., Polymer Letters (J. of Polymer Sci.) pt. B, vol. 4, pp. 869–873 (1966).

JAY H. WOO, Primary Examiner

U.S. Cl. X.R.

264—184; 260—78

PO-1050
(5/69)

UNITED STATES PATENT OFFICE
CERTIFICATE OF CORRECTION

Patent No. 3,583,953      Dated June 8, 1971

Inventor(s) Hans-Dieter Rupp et al

It is certified that error appears in the above-identified patent and that said Letters Patent are hereby corrected as shown below:

Column 1, line 62, "for a" should read -- from a --; line 70, that portion of the formula reading "C=H" should read -- C=N --.

Column 2, line 9, "dientii" should read --identi- --; line 36, "haped" should read -- shaped --.

Column 3, line 41, "vosity" should read -- cosity --; line 60, "-CH=CH" should read -- -CH=CH- --.

Column 4, line 1, " o r" should read -- or --; line 46, "solubility of" should read -- solubility curve of --.

Column 5, line 2, "3" should read -- 2 --.

Signed and sealed this 21st day of March 1972.

(SEAL)
Attest:

EDWARD M. FLETCHER, JR.
Attesting Officer

ROBERT GOTTSCHALK
Commissioner of Patents